Dec. 7, 1937. J. R. LITTY ET AL Re. 20,572

CAKE ICING MACHINE

Original Filed April 14, 1930 8 Sheets-Sheet 1

WITNESS:

C. H. Cook

T. B. Humphries

INVENTORS

John R. Litty

Trued B. Lundin

BY

Joshua R. H. Potts

ATTORNEY

Dec. 7, 1937. J. R. LITTY ET AL Re. 20,572
CAKE ICING MACHINE
Original Filed April 14, 1930 8 Sheets-Sheet 2
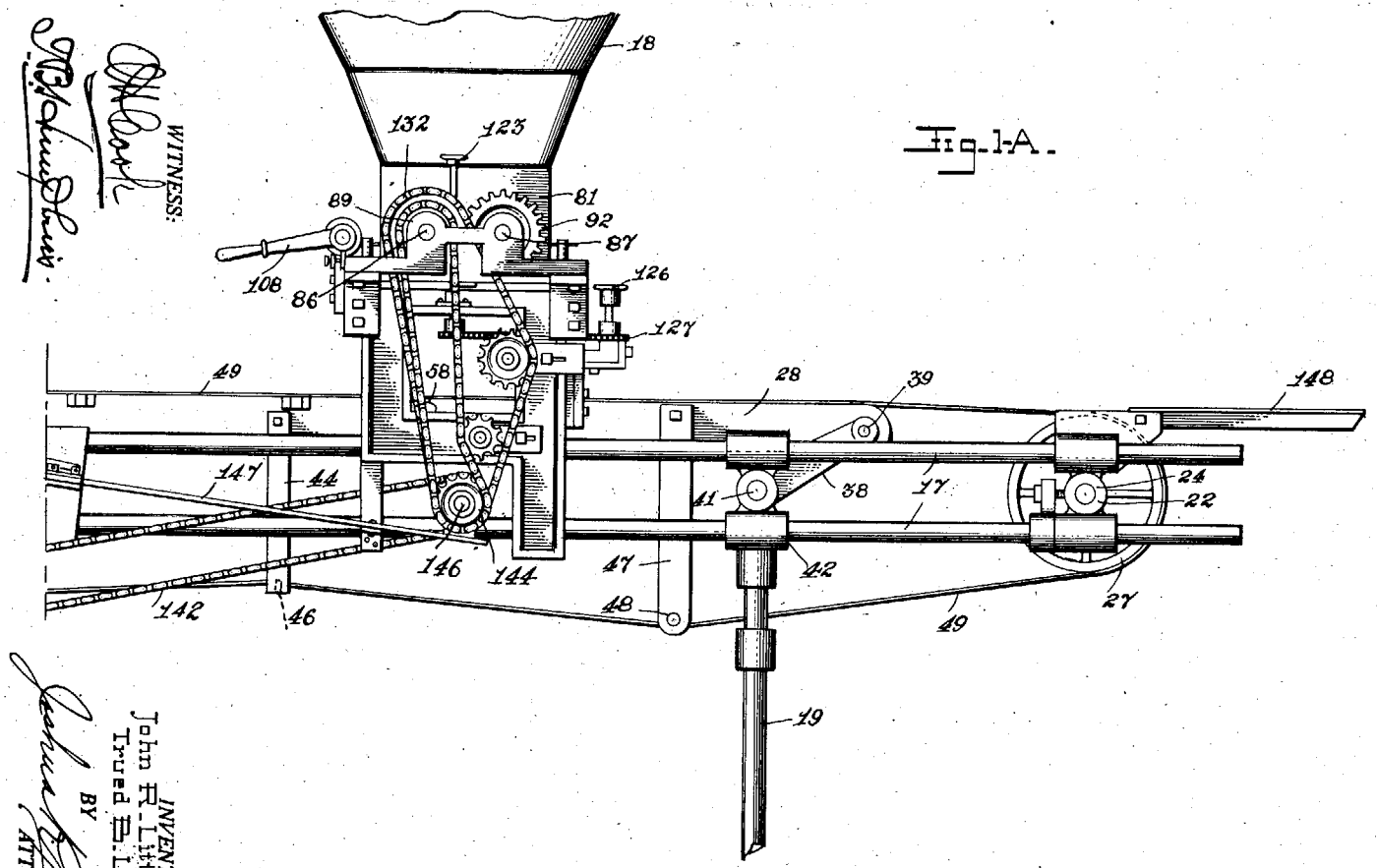
Fig. 1-A.
WITNESS:
INVENTORS
John R. Litty
Trued B. Lundin
BY
ATTORNEY Dec. 7, 1937. J. R. LITTY ET AL Re. 20,572

CAKE ICING MACHINE

Original Filed April 14, 1930 8 Sheets-Sheet 3

WITNESS:

INVENTORS
John R. Litty
Trued B. Lundin.
BY
Joshua R. H. Potts
ATTORNEY

Dec. 7, 1937. J. R. LITTY ET AL Re. 20,572
CAKE ICING MACHINE
Original Filed April 14, 1930 8 Sheets-Sheet 4
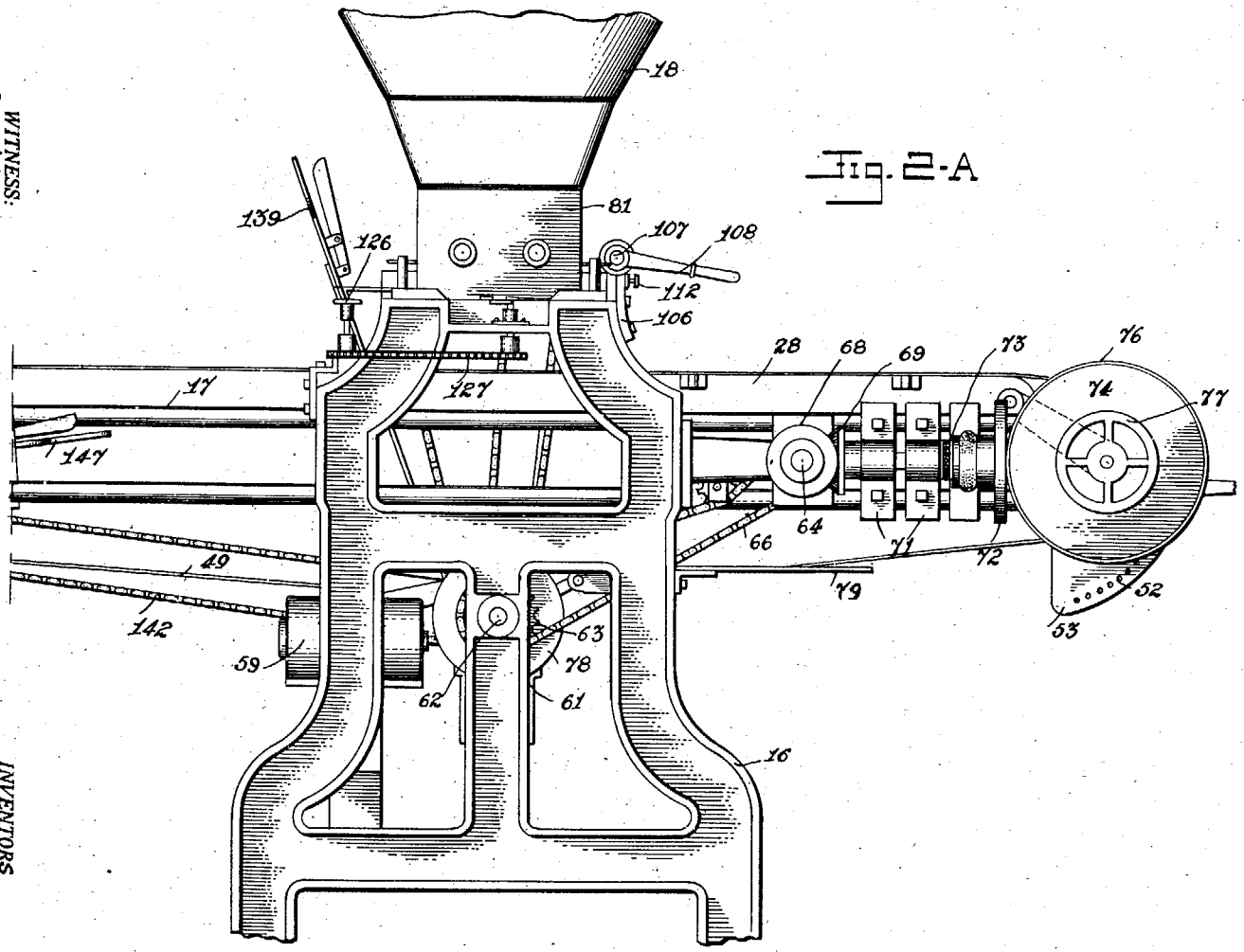
Fig. 2-A
WITNESS:
INVENTORS
John R. Litty
Trued B. Lundin.
BY
ATTORNEY Dec. 7, 1937.

J. R. LITTY ET AL

CAKE ICING MACHINE

Re. 20,572

Original Filed April 14, 1930 8 Sheets-Sheet 5

WITNESS:

INVENTORS
John R. Litty
Trued B. Lundin
BY
Joshua R. H. Potts
ATTORNEY

Dec. 7, 1937.
J. R. LITTY ET AL
CAKE ICING MACHINE
Original Filed April 14, 1930 8 Sheets-Sheet 6
Re. 20,572
Fig. 3-A
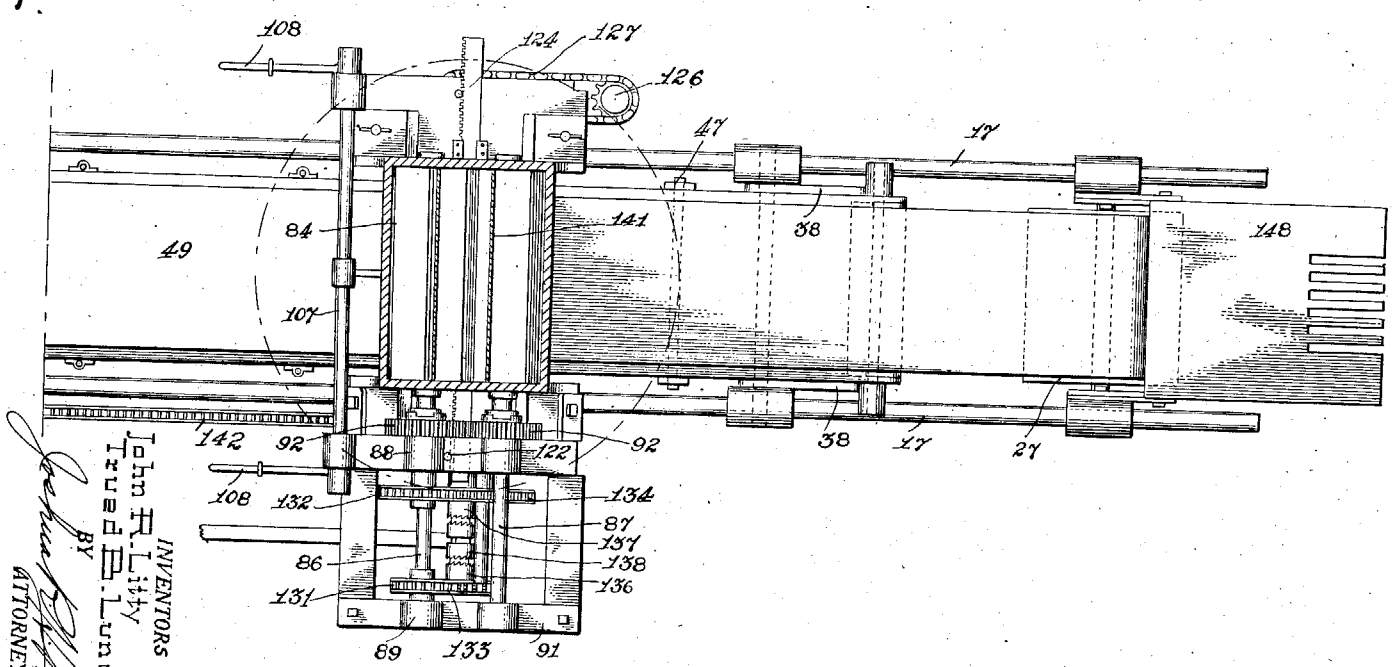
WITNESS.
INVENTORS
John R. Litty
Trued B. Lundin
BY
Joshua R. H. Potts
ATTORNEY Dec. 7, 1937.

J. R. LITTY ET AL

Re. 20,572

CAKE ICING MACHINE

Original Filed April 14, 1930 8 Sheets-Sheet 7

WITNESS:

INVENTORS
John R. Litty
Trued B. Lundin
BY
Joshua R. H. Potts
ATTORNEY

Dec. 7, 1937. J. R. LITTY ET AL Re. 20,572

CAKE ICING MACHINE

Original Filed April 14, 1930 8 Sheets-Sheet 8

WITNESS:

O. H. Cook

T. B. Lundquist

INVENTORS

John R. Litty

Trued B. Lundin.

BY

Joshua R. H. Potts

ATTORNEY

Reissued Dec. 7, 1937

Re. 20,572

UNITED STATES PATENT OFFICE 20,572

CAKE ICING MACHINE

John R. Litty, and Trued B. Lundin, deceased, late of Philadelphia, by Elizabeth H. Litty, assignee, Philadelphia, Pa.

Original No. 1,881,747, dated October 11, 1932, Serial No. 443,982, April 14, 1930. Application for reissue July 8, 1937, Serial No. 152,584

18 Claims. (Cl. 91—3)

This invention relates to a cake icing machine and is particularly adapted for the icing of all kinds and sizes of cakes in a bakery, such for instance as cup cakes, square or oblong layers, all kinds of sweet doughs, doughnuts, eclairs, cream puff shells, filling of such cakes as "devil dogs" and all other small units where you put a sheet of icing on the top, or where you put a filler in the cake and thereafter ice the top, regardless of whether it has one, two or three layers.

Cake icing machines in bakeries are not new. Machines have been devised wherein icing was fed from a hopper onto a plurality of cakes, continuously moving beneath the hopper on an endless belt or the like, but these machines have all proven unsatisfactory in that they are incapable of efficiently depositing the different kinds of icings upon cakes under all different conditions.

The general kinds of icings used in a bakery are butter cream icings, grease icings, marshmallow icings and water icings. There are, of course, several icings between these broad general classes, but these are the outstanding species.

Butter cream icings and grease icings are something like putty, that is, they are of a consistency akin to putty, a layer of the same will crack and pull apart, but will not stretch, while marshmallow icing is capable of stretching and may, in its stretched condition, be deposited upon a line of continuously moving cakes without any apparent decrease in thickness.

Water icings are of very thin consistency and flow very readily.

Let us, for the sake of example, consider that a hopper has a certain feed means from the bottom of the same which has a constant speed and that the endless belt or table on which the cakes travel has a constant speed. It follows that if the machine is regulated so that a water icing will be properly fed onto the tops of cakes carried by this endless belt or table that when butter cream or grease icings are fed from the hopper, the speed of the table will be too rapid to properly cover the cakes with this slower or more sluggish icing. This results in the tearing or pulling apart of the icing and some cakes will only be partially covered, and in the case of small cakes, some will receive no icing.

The object of the present invention is to provide a cake icing machine in which both the speed of the icing feed and the speed of travel of the cakes may be regulated in order that cakes may be properly covered with icing of different characters and consistencies, therefore, providing flexibility for each requirement.

A further object of the invention is to provide mechanism for quickly and conveniently adjusting these speeds in order to obtain the desired result.

Another object of the invention is to provide the feed mechanism for delivering a uniform layer of icing.

According to the invention the cake icing machine is provided with a continuous belt or table which may be adjusted in height, a hopper for containing the icing and provided with rotating means for feeding the icing from the bottom thereof, means for adjusting the width and thickness of said icing, means for adjusting the speed of said feeding means, and means for adjusting the linear speed of said endless belt or table.

The machine may be provided with means for preventing any lumpy material from clogging the fed stream of icing and with means for maintaining the head of the icing in feeding position above said feeding means.

The machine may also be provided with means for elevating the table to a height where there will be the best result in coating the cakes with the icing fed from the hopper.

The machine may also be provided with a plurality of hoppers and means provided for independently raising the table to the desired position between each hopper.

The drawings illustrate an embodiment of the invention and the views therein are as follows:

Figures 1 and 1–A represent a front view of an icing machine having two icing hoppers, Figures 2 and 2–A represent a rear view of the same, Figures 3 and 3–A represent a top plan view of the same with the hopper removed and the feed chambers in section, Figure 4 is a vertical sectional view of the hopper and feed chamber and adjacent mechanism, Figure 5 is a fragmentary end view looking in the direction of the arrow in Figure 4, Figure 6 is a fragmentary longitudinal section between the traveling belt supports and is taken beneath either one of the hoppers, Figure 7 is a fragmentary front view of the operating means for adjusting the thickness of the fed icing.

Figure 1:
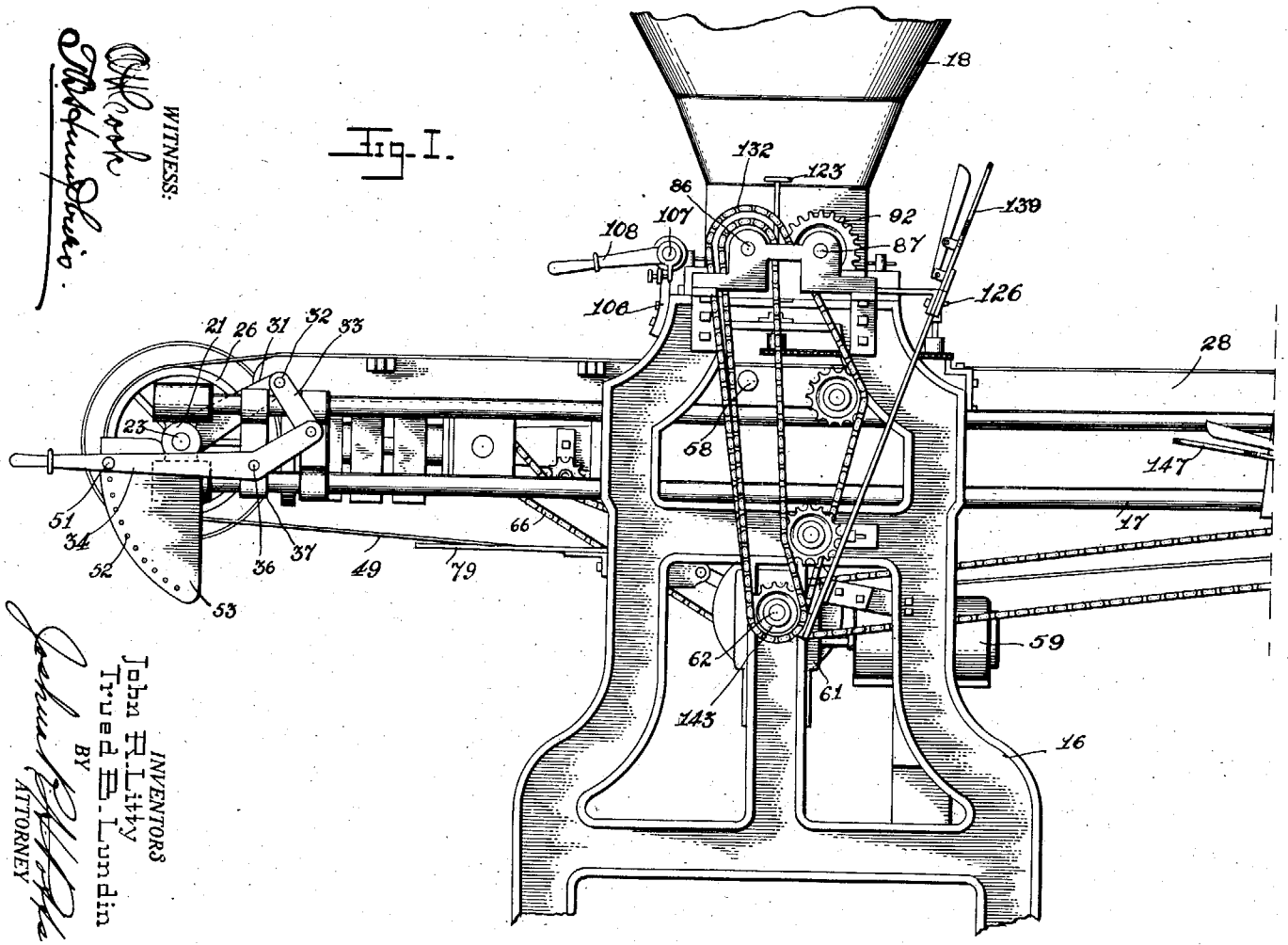

The icing machine is mounted on suitable side standards 16 which rest upon the floor and securely fastened to each of these standards are pairs of supporting bars 17. The length of these bars is determined by the number of hoppers 18 on the machine, and these bars are additionally supported by pedestal bars 19 and such pedestal bars and the side standards 16 may be provided with casters for moving the machine from place to place in the bakery.

The supporting bars 17 are provided at a point near their forward end with an intermediate bearing housing 21 and at a point near their outer end with an intermediate bearing housing 22. Between these bearing housings on the opposite sides of the machine there extend shafts 23 and 24, respectively. On the shaft 23 there is mounted a pulley 26, while on the shaft 24 there is mounted a pulley 27.

A belt supporting frame 28 is formed from a pair of longitudinally disposed angle bars having cross bars 29 between the same and this frame is supported on its forward end by a supporting arm 31 which is pivotally mounted on the shaft 23 at its one end and pivotally mounted at 32 on the said frame at its other end.

There is also pivotally mounted at 32 a link 33 whose other end is pivotally connected to the inner end of an operating lever 34, and this operating lever is pivotally connected at 36 on a member 37 connecting the two front supporting rods 17.

The extreme end of the frame 28 is supported by a link 38 which is pivotally connected thereto at 39 and whose other end is rotatably mounted on a shaft 41 in a bearing connection 42 extending between the supporting rod 17.

The frame 28 has a downwardly extending leg 44 extending down from each of the angle bars with a bar 46 extending between the lower ends of these downwardly extending bars.

It also is provided with downwardly extending bars 47, one of which is connected at its upper end to each of the said angle bars and the lower ends of these bars are provided with a rod 48 which extends between the same.

Resting upon the frame 28 and extending over the pulleys 26 and 27 and over the rod 46 in the bars 44, and under the rod 48 in the bars 47 is an endless belt 49.

The upper side of this belt is raised by the raising of the frame 28 and this is accomplished by grasping the hand lever 34 and lowering the same, and since this bar is pivoted at the point 36, the link 33 will raise the frame on account of its pivotally connected lever 31, and the frame may be retained at any desired height by permitting a spring pressed pin 51 to engage the desired hole 52 in the regulating plate 53.

Of course, the frame 28 and upper part of the belt 49 will always be parallel with the supporting bars 17 as the levers or arms 31 and 38 are of uniform size.

With this frame adjusting the cakes may always be brought into such relation with the fed icing from the hoppers 18 so that the machine will have its utmost efficiency.

In addition to the bodily elevation of the frame and continuous belt, there is provided beneath each of the hoppers and on the cross bars 29 of the frame 28 a hinged plate 54, one end of which may be raised by means of a cam 56 mounted on a shaft 57 extending between the angle bars forming said frame. This cam is operated by means of a hand wheel 58. (See Figures 1, 1–A, and 6).

When the frame is raised the bars 44 and 47 will, of course, be drawn upward therewith and the additional length of the belt across the top and between the pulleys 26 and 27 will be provided for by the diminishing of the length required between the bottoms of said pulleys by reason of the raising of the rod 48 carried by the bars 47.

This mechanism is so arranged that any raising in the belt will be compensated for by the raising of the rod 48. Of course, it will not be necessary in the case of the plates 54 to provide any release of any part of the belt as there is sufficient slack in the same to permit this additional rise which, in any event, will be only negligible when considered as increasing the length of travel.

The belt is operated by the following mechanism:

The motor 59, shown in Figure 1, has its armature shaft extending into a gear box 61 and through the gears in which the main shaft 62 is driven. This main shaft 62 is provided with a sprocket 63 which drives a stub shaft 64 through the medium of a chain 66 extending over the sprocket 63 and over a sprocket 67 on said stub shaft.

This stub shaft 64 is provided with a bevel gear 68 which meshes with a bevel gear 69 mounted in bearings 71 supported by the supporting rods 17 and on the end of said shaft there is provided a friction disc 72, while between the supporting sleeve of said disc and said outer bearing there is a thrust bearing 73.

This disc 72 is engaged by a friction wheel 74 provided with a leather or other frictional facing 76 and said friction wheel 74 may be adjusted so that its periphery engages any desired point on the friction disc 72 by means of the hand wheel 77.

Figure 2:
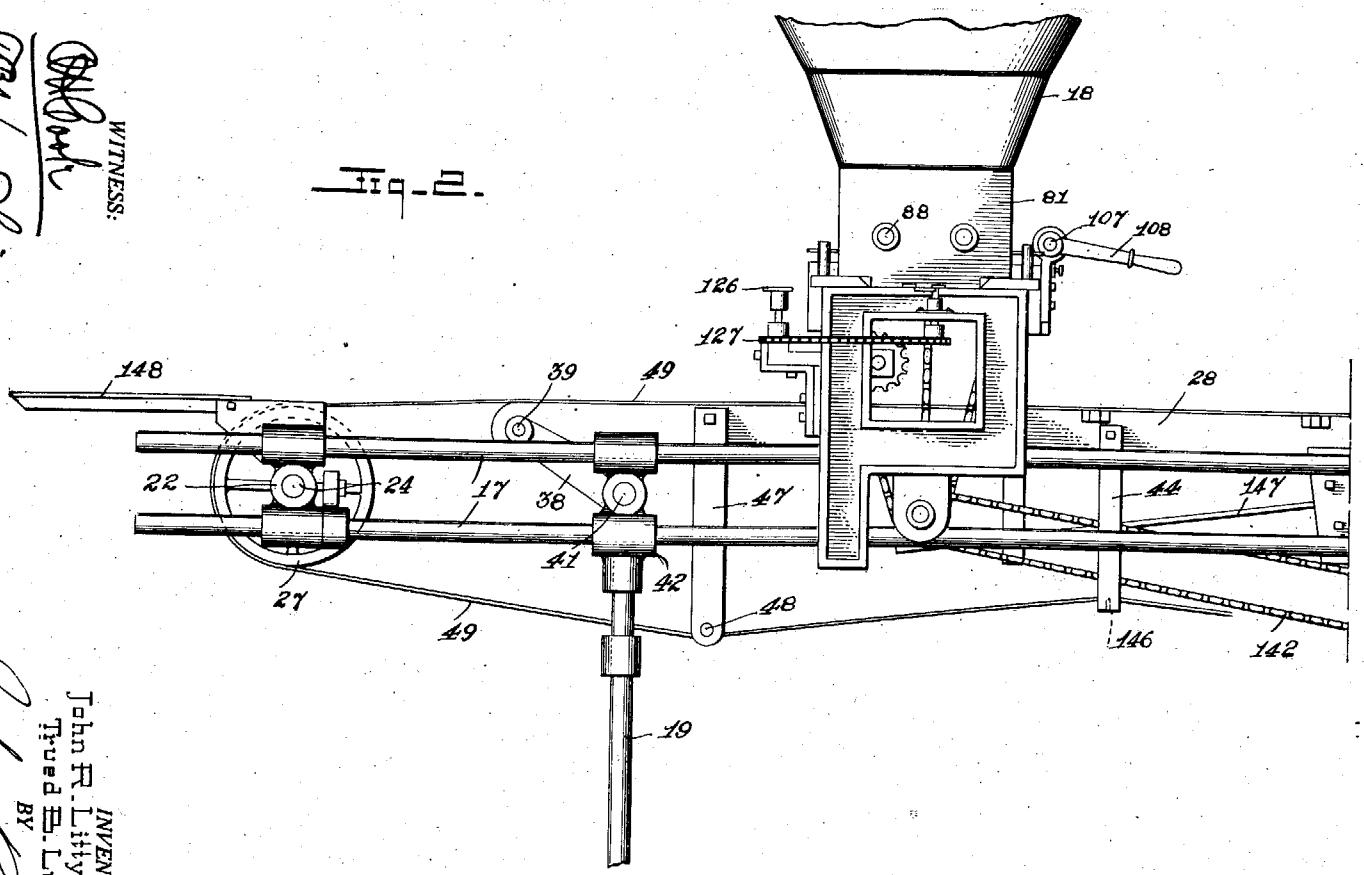
Figure 5:
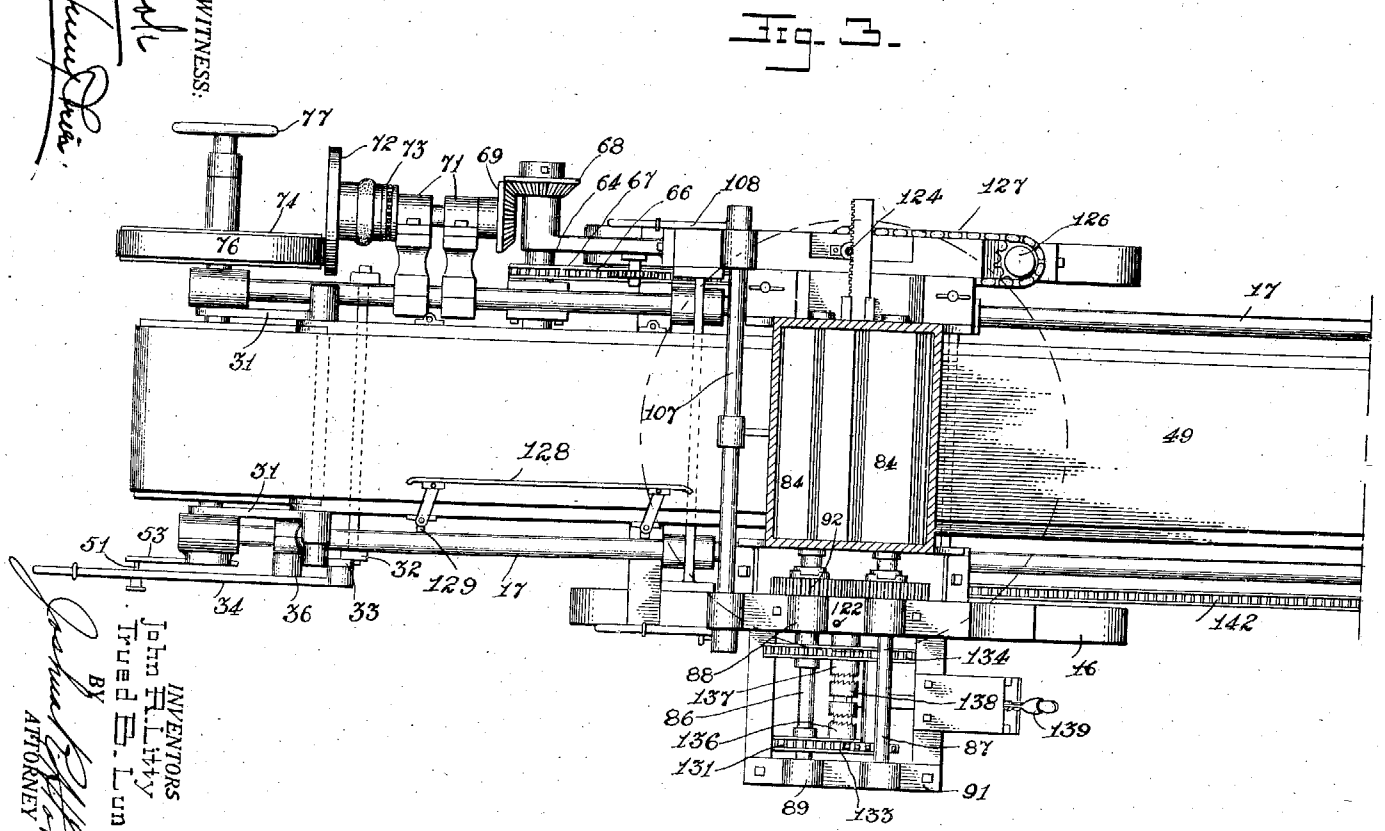

The sprocket wheel 63 (see Figure 2–A) is loosely mounted on the main shaft 62 and is provided with a clutch 78 which may be operated by means of the handle 79 for securing the said sprocket in rotating engagement with said shaft 62.

Each hopper 18 is mounted on a feed box 81. This feed box 81 is preferably cast and has a slot 82 extending across the bottom of the same. The sides parallel with the slot are arcuate, as at 83, and are of the same radius as the feed rolls 84. These feed rolls, two in number, are mounted on shafts 86 and 87, respectively.

The shafts are journaled in the sides of the feed box and on the front of the machine extend outward through bearing housings 88 on the side standards and thence into bearings 89 in a bracket 91.

Figure 4:
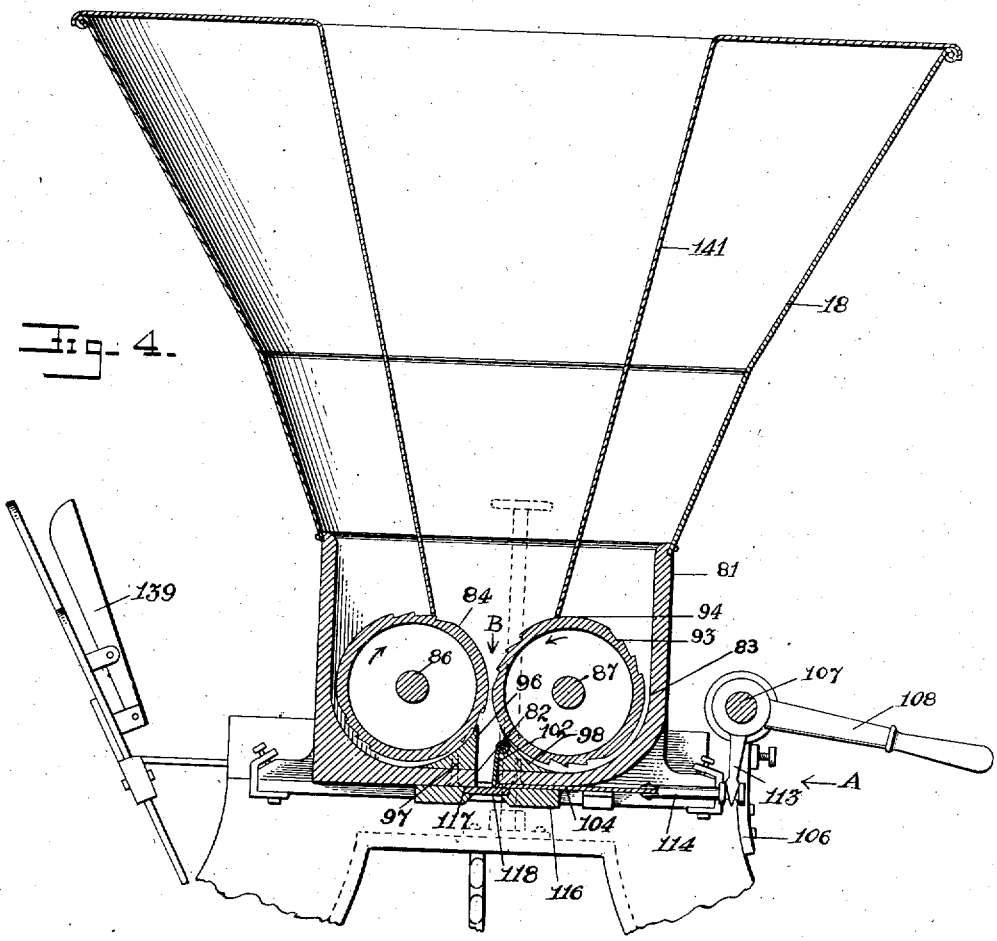
Figure 5:
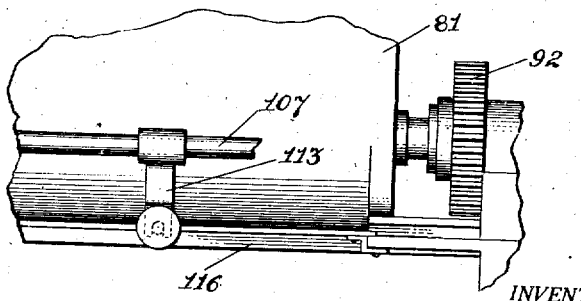
Figure 6:
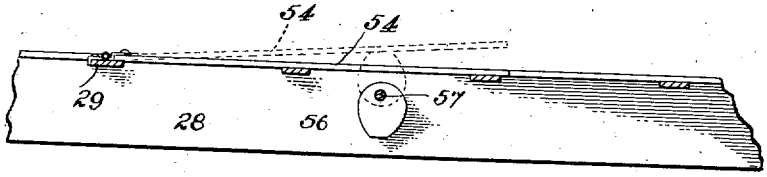

These shafts are each provided with a gear 92 which intermesh so that said rolls will rotate together. These rolls are provided on their periphery with several series of longitudinal teeth 93 providing uncut portions 94 between each series and the rolls are so mounted and so meshed by the gears 92 so that a series of teeth 93 on one roll is always opposite to the uncut portion 94 in the other roll. The relation changes from one roll to the other as the same are rotated downward in the direction of the arrow B in Figure 4.

Extending along the icing slot 82 and having its outer edge flush with the edge of said slot is a roll scraping plate 96. This plate is mounted on the inside of the bottom of the feed box and is held in position by the screws 97.

Figure 9:
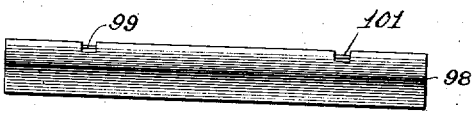
Figure 9 is a side view of one of the scraping plates used in the bottom of the feed chamber.
Figure 10:
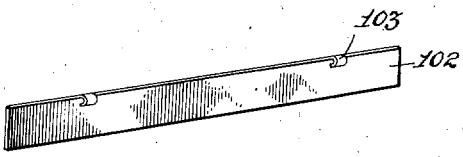
Figure 10 is the deflecting plate mounted on the scraping plate shown in Figure 9.
Figure 11:
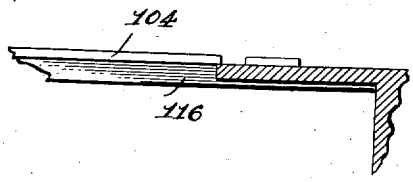
Figure 11 is a cross-sectional view taken on the line 11—11 of Figure 8.

On the other side of the icing slot 82 there is another scraping plate 98 which is mounted with its outer face flush with one side of said slot, but this plate has two or more cut-out portions 99, as shown in Figure 9, through which there extends a pin 101.

A deflecting plate 102 is adapted to be held in position by means of the scraping plate 98 and this deflecting plate is provided with a pair of small flanges 103 which fit into the cut-out portions 99 and are bent around over the pins 101 so as to form eyelets and thereby provide for the swinging of this deflecting plate.

One side of the bottom of the feed box is reduced to provide admission for a thickness adjusting plate 104. This plate is pushed back and forth across the icing slot 82 by the following mechanism:

Fastened to each of the side standards 16 is a bracket 106, the upper end of which carries a rotatable shaft 107. There is mounted on either end of this shaft and without the bracket a hand lever 108.

Figure 7:
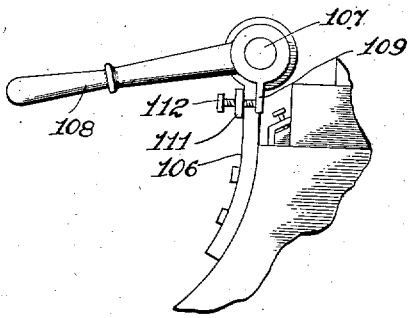
Figure 8:
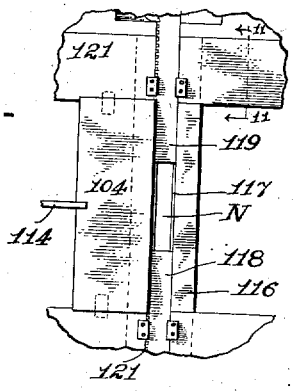
Figure 8 is a fragmentary top plan view of the icing slot beneath the icing feed chamber, and shows the plates which are adjusted to regulate the size of this slot.

On the hand lever 108 there is a finger 109, while on the bracket 106 there is an extension 111 having a threaded hole through which a limiting screw 112 extends and the end of which is directly in line with the finger 109 on the lever 108. (See Figure 7.)

The shaft 107 is provided with a bifurcated arm 113 which straddles a rod 114 between two small collars and the inner end of this rod is fastened to the thickness adjusting plate 104.

The lower end of the deflecting plate 102 extends down to the point where it will be struck by the inner end of the thickness adjusting plate 104 so that when the plate 104 is pushed inward, decreasing the width of the icing slot 82, the lower end of said plate will also be pushed over, thereby preventing any lumps or, in the case of fruit icing, any fruits from gathering or sticking on that part of the thickness adjusting plate 104 which extends within the slot 82.

This diverging plate will cause any small lumps of icing or congealed matter to break up as it passes through the reduced slot or nozzle because the force above the same caused by the rolls 84 will push the same down through the opening when there are no projections to catch and hold the same.

Mounted on the bottom of the feed box 81 and parallel to and on each side of the slot 82 is a plate 116 having longitudinal grooves 117. Between these grooves and across the slot 82 on each side of the machine there are mounted width adjusting plates 118 and 119, respectively.

These latter plates have teeth cut in one longitudinal edge of the same providing a rack 121. The plate 118 has its rack meshing with a small pinion 122 which is operated by means of a small hand wheel 123 while the plate 119 has a small pinion 124 operated by a small hand wheel 126 through the medium of a sprocket chain 127.

Through the operation of these pinions 122 and 124 the width of the nozzle N may be adjusted as desired, and when cakes are placed upon the endless belt or frame and against the guide bar 128, they will be in perfect alignment with the nozzle N so that the icing will be spread evenly over the top of the same and to the edges thereof.

These guide bars 128, shown in Figure 3, are mounted on the frame 26 and may be adjusted by loosening the set screw 129 and fixing the same in the desired position.

The shaft 86 is provided with a sprocket 131 and a relatively large sprocket 132. These sprockets are engaged by chains 133 and 134 respectively, which engage sprockets loosely mounted on the main shaft 62.

The sprocket which carries the chain 133 has a toothed clutch face 137. A sliding clutch member 138, which said member is splined to the main shaft 62, has complementary clutch faces for engaging either of the toothed clutch face 136 or 137 and is operated by means of the clutch lever 139.

It will, therefore, be seen that the rolls 84 in the feed box 81 may be operated at two speeds while, if desired, the sprockets and chains just described may be eliminated and the rolls operated through the medium of the friction drive heretofore described for operating the belt and constituting the friction disc 72 and the friction wheel 76.

The hopper 18, which is preferably funnel shaped, has partitions 141 whose side edges fit the inner face of the hopper and whose lower ends extend in close proximity to the periphery of the rolls 84 and whose upper ends are bent outwardly and fit over the beaded upper end of the hopper. The icing is fed between these partitions so that the same is always maintained in a position where it will have a head for engagement by the rolls 84 for forcing the same down through the nozzle N.

The second or rear hopper and any other hopper which may be added to the machine is an exact duplicate of the one already described and it is operated by means of a chain 142 fitting a sprocket 143 on the shaft 62 and a sprocket 144 on the shaft 146. This shaft also has a clutch arrangement similar to that on shaft 62 and this clutch is operated by means of the hand operating lever 147.

The extreme end of the machine is provided with a receiving platform 148 onto which the cakes are transferred from the belt 49.

With the particular machine shown in the drawings there are two hoppers and this is of particular advantage in many ways, for instance, the hopper at the left hand or outer end of the machine may be provided with a filling which may be deposited onto the lower layer of a cake and the operator may place another layer on top of this filled layer as the cake is placed between the hoppers, and then the right hand hopper may deposit a coating of icing on the top layer.

Again the two hoppers may be simultaneously used for icing different kinds of cakes or icing cakes with different kinds of icing. There, of course, is no limit to the number of hoppers which may be used and in the case of three layer cakes, it will only be necessary to equip the machine with an additional hopper.

The machines have proven of great utility over all former types of icing machines, including those of the applicants.

Of course, it will be understood that the machine will handle fruit icings where the fruit does not greatly exceed the thickness of the icing placed upon the cake, and it will be readily seen that with the provision of a speed regulating device for the icing feed and also with a speed regulating device for the linear speed of the endless belt or table the machine will provide a flexibility which will permit cakes of any character or description to be properly iced with any kind of icing used in the bakery.

Of course, the cake icing machine illustrated may be modified and changed in various ways without departing from the invention herein set forth and hereafter claimed.

The invention is hereby claimed as follows:

1. A cake icing machine comprising a movable support for cakes, an icing receptacle having means therein for feeding the icing from the bottom thereof directly onto said cakes, a main shaft for driving said support and said means, and means for regulating the relative speed between said moving support and said icing feed.

2. A cake icing machine comprising an endless belt for carrying cakes, an icing receptacle having rolls therein for feeding a layer of the icing from the bottom thereof directly onto the tops of said cakes, a main shaft for driving said belt and said rolls, and speed adjusting means for regulating the relative speed between said table and said icing feed.

3. A cake coating machine comprising a movable support for carrying cakes, adjustable guide bars for positioning the cakes on said support, a receptacle for coating material having means therein for feeding a layer or the material therefrom and onto the tops of said cakes, and means for regulating the relative speed between said moving support and said coating material feed.

4. Coating material feeding mechanism comprising a hopper, a nozzle at the bottom of said hopper formed by a swingable side plate and two movable end plates, means for adjusting each of said plates, means cooperating with said side plate for directing the material through said nozzle, and means in said hopper for forcing said material through said nozzle.

5. Coating material feeding mechanism comprising a hopper, a nozzle at the bottom of said hopper formed by a swingable side plate and two movable end plates, means for adjusting each of said plates, a swingable plate cooperating with said side plate for directing the material through said nozzle, and rolls in said hopper for forcing said material through said nozzle.

6. Coating material feeding mechanism comprising a hopper, a nozzle at the bottom of said hopper formed by a swingable side plate and two movable end plates, means for adjusting the side plate and rack and pinion means for adjusting the end plates, means cooperating with said side plate for directing the material through said nozzle, and means in said hopper for forcing said material through said nozzle.

7. Coating material feeding mechanism comprising a hopper, a nozzle at the bottom of said hopper formed by a swingable side plate and two movable end plates, means for adjusting the side plate and rack and pinion means for adjusting the end plates, a swingable plate cooperating with said side plate for directing the material through said nozzle, and rolls in said hopper for forcing said material through said nozzle.

8. A cake icing machine comprising a movable belt for carrying cakes, single means for raising and lowering said belt throughout its length, means for independently raising and lowering certain parts of the belt, an icing receptacle having means therein for feeding the icing therefrom and onto said cakes, and means for regulating the relative speed between said belt and said icing feed.

9. A cake icing machine comprising a movable belt for carrying cakes, a hand operating lever for raising and lowering said belt throughout its length, means for independently raising and lowering certain parts of the belt, an icing receptacle having means therein for feeding the icing therefrom and onto said cakes, and means for regulating the relative speed between said belt and said icing feed.

10. A cake icing machine comprising a movable belt for carrying cakes, means for raising and lowering said belt throughout its length, an icing receptacle having means therein for feeding the icing from the bottom thereof directly onto said cakes, a main shaft for driving said belt and said means, means for raising the table at the point where it passes beneath said receptacle, and means for regulating the relative speed between said belt and said icing feed.

11. A cake coating machine comprising an endless belt for carrying cakes, a plurality of coating material receptacles arranged along the length of the belt and having means therein for feeding the material therefrom and onto said cakes, means for raising and lowering the belt throughout its length, and separate means for raising or lowering the belt at the points where it passes beneath the respective receptacles.

12. A cake coating machine comprising an endless belt for carrying cakes, a plurality of coating material receptacles having means therein for feeding the material therefrom and onto said cakes, means for raising and lowering the belt throughout its length, separate means for raising or lowering the belt at the points where it passes beneath the respective receptacles, and speed regulating means for varying the linear speed of said belt.

13. A cake coating machine comprising an endless belt for carrying cakes, a plurality of coating material receptacles having means therein for feeding the material therefrom and onto said cakes, means for raising and lowering the belt throughout its length, separate means for raising or lowering the belt at the points where it passes beneath the respective receptacles, speed regulating means for said belt, and speed regulating means for said material feeding means whereby the relative speed between said belt travel and said coating material feeds may be independently regulated as desired.

14. A machine for forming a continuous ribbon of icing of different natures and consistencies and applying the same to the upper surfaces of a series of cakes, comprising in combination, a continuously driven support for carrying cakes, an icing receptacle above the said support, continuously driven spaced rolls in said receptacle for feeding icing from the bottom thereof directly onto said cakes, means for adjusting the width and thickness of the icing ribbon delivered from said receptacle, and means for regulating the relative speed between said support and said icing feed.

15. A machine for forming a continuous ribbon of icing of different natures and consistencies and applying the same to the upper surfaces of a series of cakes, comprising in combination, a continuously driven support for carrying cakes, an icing receptacle above the said support, continuously driven spaced toothed rolls in said receptacle for feeding icing from the bottom thereof directly onto said cakes, means for adjusting the width and thickness of the icing ribbon delivered from said receptacle, and means for regulating the relative speed between said support and said icing feed.

16. A machine for forming a continuous ribbon of icing of different natures and consistencies and applying the same to the upper surfaces of a series of cakes, comprising in combination, a continuously driven support for carrying cakes, an icing receptacle above the said support, continuously driven spaced rolls in said receptacle for feeding icing from the bottom thereof directly onto said cakes, means for varying the distance between the support and hopper, means for adjusting the width and thickness of the icing ribbon delivered from said receptacle, and means for regulating the relative speed between said support and said icing feed.

17. A machine for forming a continuous ribbon of icing of different natures and consistencies and applying the same to the upper surfaces of a series of cakes, comprising in combination, a continuously driven support for carrying cakes, an icing receptacle above the said support, continuously driven spaced rolls in said receptacle for feeding icing from the bottom thereof directly onto said cakes, movable plates for adjusting the width and thickness of the icing ribbon delivered from said receptacle, and means for regulating the relative speed between said support and said icing feed.

18. A cake coating machine comprising in combination, a continuously driven support for carrying cakes, a plurality of spaced coating material receptacles above the said support, continuously driven spaced toothed rolls in each of said receptacles cooperating with means for forming the coating material ribbons onto said cakes, means for independently adjusting the distance between the support and each receptacle, and means for independently regulating the relative speed between said support and each coating material feed.

JOHN R. LITTY.
ELIZABETH H. LITTY,
*Assignee of Trued B. Lundin, Deceased.*